United States Patent [19]

Preusker

[11] Patent Number: 5,223,058
[45] Date of Patent: Jun. 29, 1993

[54] DEVICE FOR THE ATTACHMENT OF AN ANTISKID DEVICE TO A MOTOR VEHICLE WHEEL RIM

[75] Inventor: Werner J. Preusker, Sauldorf, Fed. Rep. of Germany

[73] Assignee: Confon AG, Rheinbeck, Switzerland

[21] Appl. No.: 697,761

[22] Filed: May 9, 1991

[30] Foreign Application Priority Data

Jun. 23, 1990 [DE] Fed. Rep. of Germany ....... 4020050

[51] Int. Cl.⁵ .............................................. B60C 27/00
[52] U.S. Cl. .................................... 152/216; 152/170; 301/40.1
[58] Field of Search ............... 152/167, 170, 178, 180, 152/181, 185, 186, 190, 213 R, 233, 234, 236, 237, 216; 301/40 R, 405, 41 R, 375, 118

[56] References Cited

U.S. PATENT DOCUMENTS

| 3,470,932 | 10/1969 | Mathews | 156/216 |
| 3,935,891 | 2/1976 | McCloud | 152/225 R |
| 4,884,933 | 12/1989 | Preusker et al. | 411/177 |

FOREIGN PATENT DOCUMENTS

| 0397067 | 11/1990 | European Pat. Off. |  |
| 8530606 | 4/1986 | Fed. Rep. of Germany |  |
| 122802 | 6/1987 | Japan | 301/40 R |
| 94004 | 4/1989 | Japan | 301/40 R |
| 132410 | 5/1989 | Japan | 301/40 R |
| 169311 | 6/1990 | Japan | 301/40 R |

Primary Examiner—Michael W. Ball
Assistant Examiner—Francis J. Lorin
Attorney, Agent, or Firm—Herbert Dubno

[57] ABSTRACT

The invention relates to a device for the releasable attachment of an antiskid device to the rim of a motor vehicle wheel, having: a base disc which is formed with a central opening and can be screwed coaxially to the outside of the rim; and a more particularly disc-shaped bearing member which can be coaxially attached to the outside of the base disc by a snap closure disposed in the zone of the opening and which cooperates with the base disc to form an annular gap in which the inner edge of a supporting disc is inserted rotatably mounted, while attached to the supporting disc are radially outwardly extending arms bearing the antiskid device, the base disc taking the form of a flat disc whose central opening receives a central projection of the bearing member, said projection being positively and releasably retained in or on the opening and secured in the attached position by a latching member which locks the releasable connection.

7 Claims, 4 Drawing Sheets

DEVICE FOR THE ATTACHMENT OF AN ANTISKID DEVICE TO A MOTOR VEHICLE WHEEL RIM

FIELD OF THE INVENTION

The invention relates to a device for the releasable attachment of an antiskid device to the rim of a motor vehicle wheel. More particularly the invention relates to an antiskid device a base disc which is formed with a central opening and can be screwed coaxially to the outside of the rim, and a disc-shaped bearing member which can be coaxially attached to the outside of the base disc by a bayonet connection disposed in the zone of the opening and which cooperates with the base disc to form an annular gap in which the inner edge of a supporting disc is inserted rotatably mounted, while attached to the supporting disc are radially outwardly extending arms bearing the antiskid device.

BACKGROUND OF THE INVENTION

It is known from German Utility Model 85 30 606 (corresponding to U.S. Pat. No. 4,884,933) to screw the base disc (hub) to a motor vehicle wheel rim laterally, using the screws or nuts by which the rim is screwed to the axle of the motor vehicle. Since the rims are formed with various arrangements of attaching holes, i.e. their number and therefore pitch and also the radius of the circle of the whole differ from vehicle to vehicle, different base discs must be kept in stock for practically every type of motor vehicle.

It is also known to provide between the base disc and the vehicle wheel rim an adapter disc formed with many openings with a variety of pitches and dimensions, so that it can be attached to the correspondingly varied wheel rims, thereby substantially reducing the number of different base discs.

During the Winter the base disc remains attached to the wheel rim, so that the antiskid device can be very rapidly mounted. However, since the prior art base discs project considerably from the wheel rim, they are very noticeable.

OBJECT OF THE INVENTION

It is an object of the invention to so improve a device of the kind specified that it can be attached to the most various wheel rims and has a low overall height.

SUMMARY OF THE INVENTION

To this end according to the invention the base disc has the configuration of a flat disc whose central opening receives a central projection of the bearing member, the projection being positively and releasably retained in or on the opening and secured in the attached position by a latching member which locks the releasable connection.

Such a metallic flat disc is not very high and therefore only projects slightly from the wheel rim, so that it is not very noticeable when the antiskid device is mounted. Moreover, such a base disc can act at the same time as an adapter disc—i.e., it can be formed with the most varied openings for a great variety of wheel rims, and therefore there is no longer any need to produce a fairly large number of different base discs.

The device according to the invention is particularly simple in construction, can readily be produced and is extremely stable. Another very great advantage is that it can readily be mounted and dismounted without the use of tools and remains securely seated.

Particularly advantageously the projection of the bearing member is retained in the opening in the base disc by a bayonet type connection. Also advantageously the edge of the opening is bent axially outwardly and radially upwardly to a cylindrical and/or conical edge from which radial projections, more particularly claws or teeth, project, beneath which projections, more particularly claws or teeth, of the central projection of the bearing member engage.

The outer edge of the base disc can be bent axially outwardly to form axially outwardly projecting annular bead, and an annular zone can be provided which extends between the central opening and the bead and receives the screw heads or nuts. Also according to the invention the central projection of the bearing member is hollow and cylindrical.

A secure seat is achieved with very simple assembly if the central projection has the latching member, which in the attached position of the bearing member to the base disc is inserted positively in at least one matching recess in the base disc. The or each recess in the base disc can be formed by the or each gap between the projections, more particularly between the claws or teeth.

Particularly advantageously the latching member is an axially sliding member which is centrally and coaxially guided in the bearing member and whose end adjacent the base disc is inserted positively in two recesses in the base disc, its end remote from the base disc forming a handle. The latching member is spring-loaded in the direction of the base disc.

For operation as an adapter disc, according to the invention the base disc is formed with numerous openings for the variously disposed screws or screw bolts of the wheel rims of different types of vehicle. The openings in the base disc can be formed by radially disposed slots. Also according to the invention the slots are spaced with pitches of 90 degrees and 72 degrees.

BRIEF DESCRIPTION OF THE DRAWING

The above and other objects, features and advantages of my invention will become more readily apparent from the following description, reference being made to the accompanying highly diagrammatic drawing in which:

FIG. 1 is an axial section through the device, with the antiskid device removed and the latching member latched in;

SPECIFIC DESCRIPTION

Figure 4:
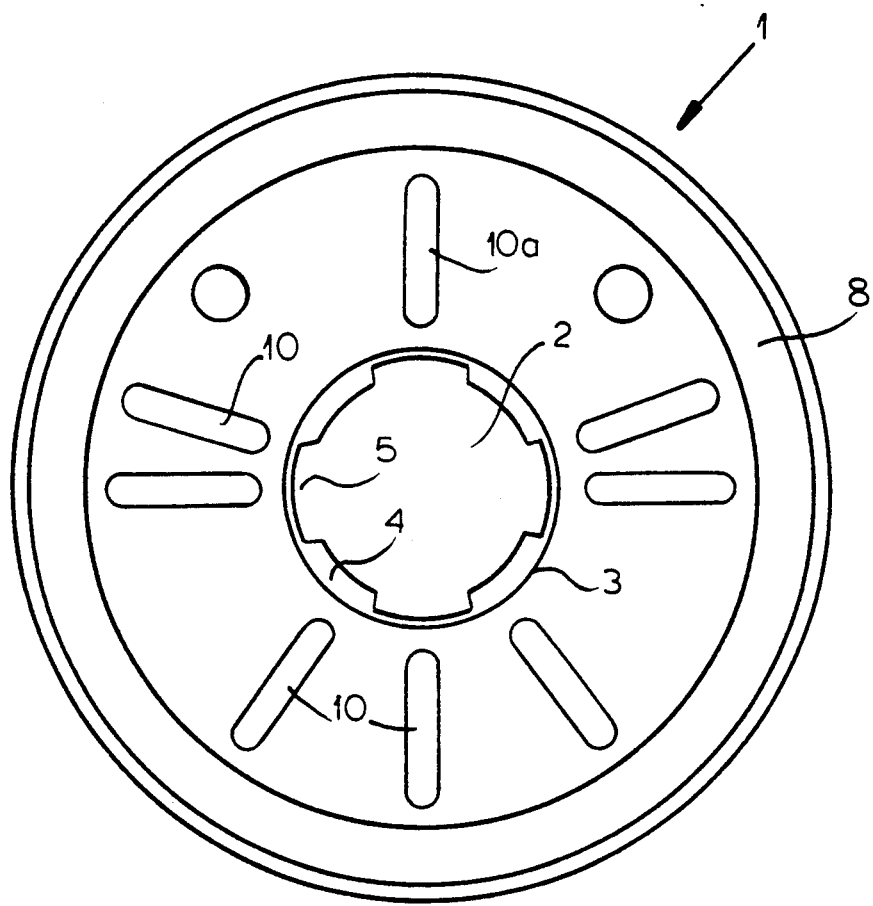
FIG. 4 is a plan view of the base disc.
Figure 5:
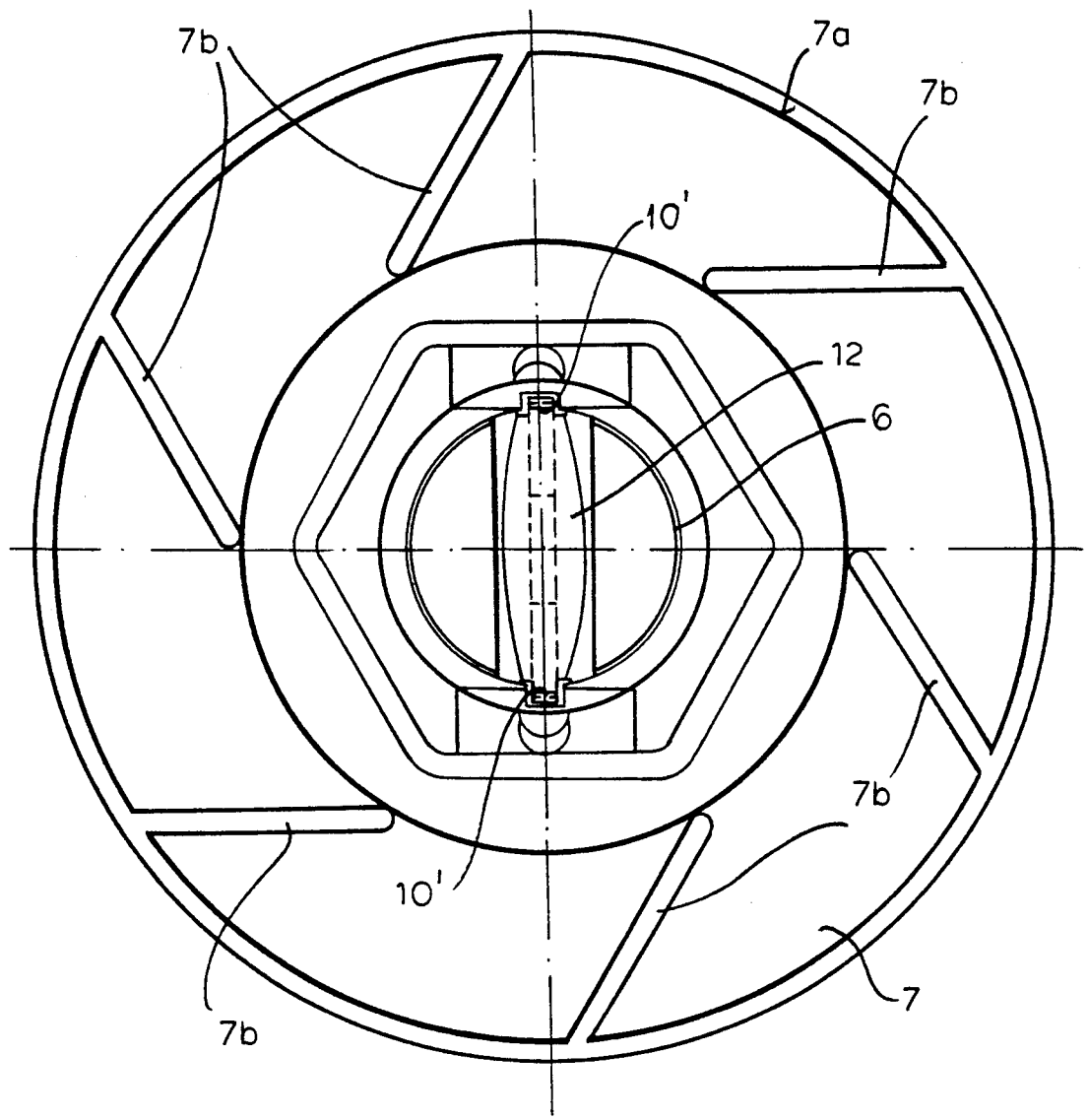
FIG. 5 is a plan view from outside of the bearing member.

A round base disc 1 to be attached to a wheel rim is produced from steel sheet in a forming die and is formed with a central opening 2 whose edge is bent outwardly upwards to a cylindrical and/or conical edge or boss 3 from which claw-like or tooth-like projections 4 (FIG. 4) project into the opening 2. The projections 4 and recesses 5 therebetween form a portion of a bayonet type connection whose second portion is formed by a central projection 6 of a bearing member having a rim 7a and ribs 7b.

The outer edge of the base disc 1 is shaped into an annular bead 8 which also projects outwardly like the edge 3, so that between the edge 3 and the annular bead 8 a lower annular zone 9 is produced which is formed with numerous openings 10 for screws or thread bolts of the wheel rims and receives the screw heads or nuts, so that they do not project much, if at all, beyond the side of the base disc 1.

Figure 2:
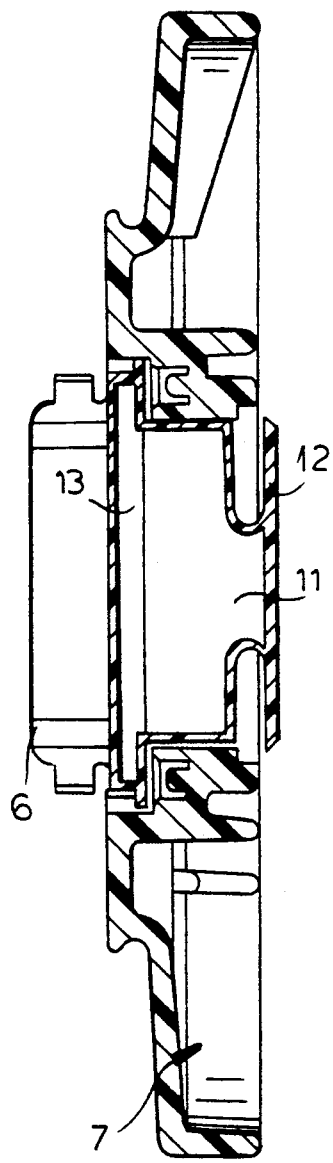
FIG. 2 is a section corresponding to FIG. 1, showing the latching member raised.
Figure 1:
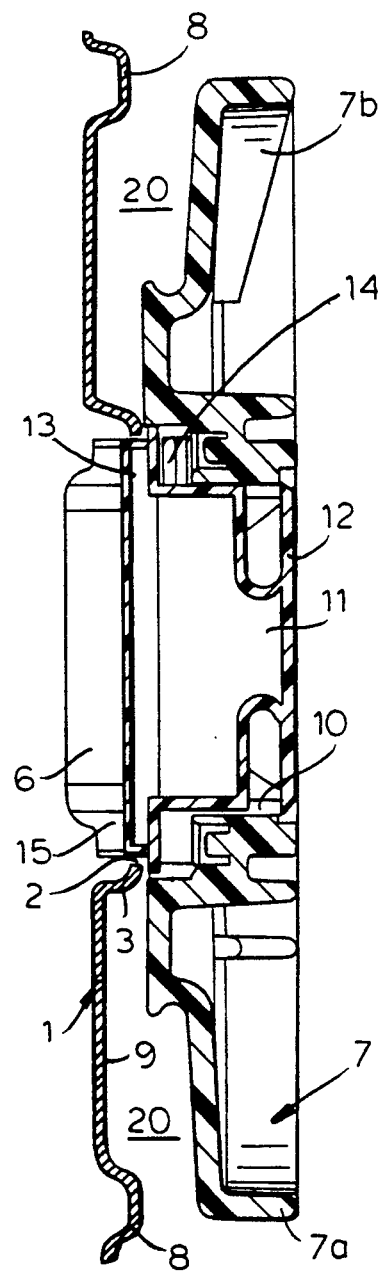
Figure 3:
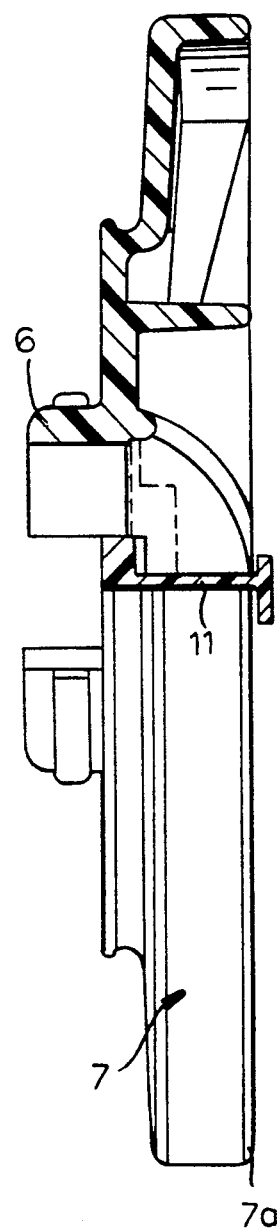
FIG. 3 is an axial section at a right angle the section shown in FIGS. 1 and 2 at the top half, and in the bottom half is a side elevation with the latching member raised.

The injection molded bearing member 7 in the form of a circular disc has a diameter which is only slightly smaller than the base disc 1 and has a formed-on central projection 6 pointing in the direction of the base disc 1. The projection 6 takes the form of a hollow cylinder or bush slotted on diametrically opposite sides. Guided in the two axis-parallel slots 10' is a latching member 11 which bears against the left side of the projection 6 along a diameter and has on the side remote from the base disc 1 a handle zone 12 by which the latching member 11 can be pulled outwards against the force of helical compression springs 14 (FIG. 1). Due to this outward pulling, a diametrically extending latching zone 13 is pulled out of the opening 2 in the base disc. In the latched-in condition the two ends of the latching zone 13 are inserted in two opposite recesses 5 (FIG. 4) in the opening 2 between the openings 4.

The cylindrical outer wall of the projection 6 is formed with projections 15 (FIG. 1) whose number, shape, size and arrangement correspond to the openings 2, so that the projection 6 with the projections 15 is axially introduced into the opening 2 and then rotated, whereafter the projections 15 engage under the projections 4 of the base disc 1. During this rotation the latching zone 13 bears against the outside of the projections 4, while the projections 4 press the latching member 11 inwards against the springs 14. As soon as the outer ends of the latching zones 13 have reached the recesses 5, the member 11 latches into the recesses 5 and the bearing member 7 is retained non-rotatably in relation to the base disc 1. Only when the latching member 11 has been raised via the handle 12 can the latching zone 13 be pulled out of the recesses 5 and the bearing member 7 again rotated to remove it from the base disc 1.

When the bearing member 7 is attached to the base disc 1, between the members 1 and 7 an annular gap 20 is left in which an annular zone of a supporting disc (not shown) is rotatably mounted. Externally the supporting disc forms arms which retain the antiskid means on the tire tread.

The base disc 1 is formed with numerous openings 10 for the differently disposed screws or screw bolts of the rims. The slot-shaped openings are radially disposed, so that the screws or thread bolts can be engaged even if they are disposed with different radii or on circles with different diameters. The radial slots 10 form angles or pitches with one another, four slots forming with one another four angles of 90 degrees and five slots five angles of 72 degrees, one slot 10a being used in both pitch systems.

When the bearing member 7 is removed, attached to the outside of the base disc 1 mounted on the wheel rim is an ornamental cap which can also be retained by a bayonet type connection using the opening 2 in the base disc 1—i.e., the inside of the ornamental disc or cap (not shown) is formed with a projection having individually externally formed-on radial projections which extend into the recesses 5 and, after being inserted axially, engage behind the projections 4.

Figure 6:
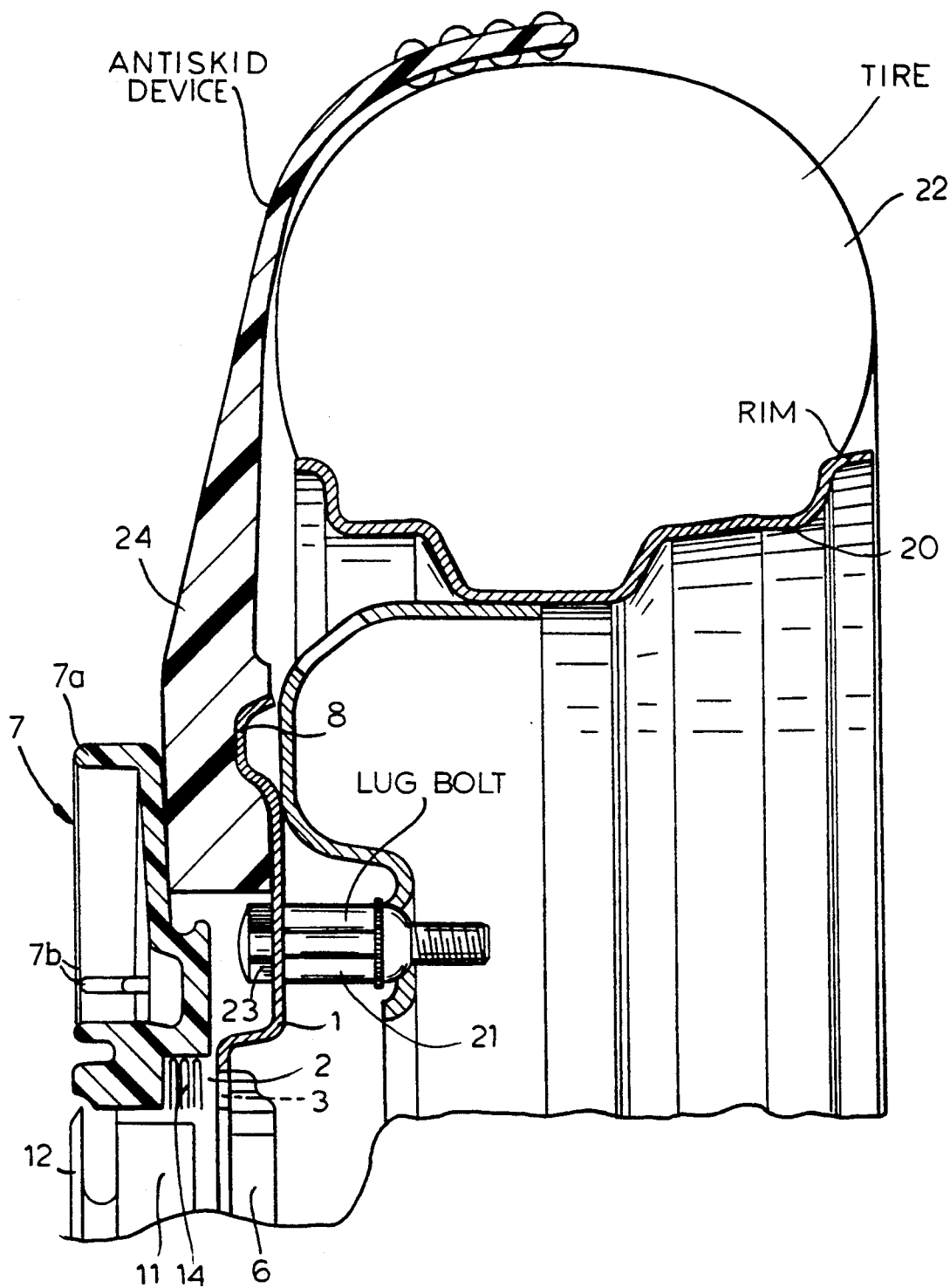
FIG. 6 is a cross sectional view of a wheel provided with the antiskid device held in place by the mount of the invention.

In FIG. 6 the wheel is shown to comprise a rim 20 held on the wheel hub by lug bolts 21 and provided with a tire 22. The mount, comprising the bearing member 7 and the base plate or disk 1 holds the antiskid device 24 in place and is secured by screws 23 which pass through the openings 10 or 10a to secure the base disk 1 in place.

I claim:

1. A mount for an antiskid device, comprising:
   a generally flat sheet-metal base disk formed with:
   a central hole,
   formations around an inner edge of said central hole and unitary therewith defining one half of a bayonet coupling,
   an outer edge, and
   a plurality of angularly spaced openings in the generally flat base disk between said central hole and said outer edge for receiving bolts attaching said base disk to a vehicle wheel so that said base disk can remain in place thereon;
   a disk-shaped bearing member removable attachable to said base disk for retaining an antiskid device between said bearing member and said base disk, said bearing member being formed with:
   an integral central projection extending axially from said bearing member and dimensioned to be received in said hole, and
   formations around said central projection engageable behind the formations on said base disk around said central hole and forming another half of said bayonet coupling whereby said bearing member is temporarily retained on said base disk upon insertion of said projection in said hole and interengagement of the formations of the bayonet coupling; and
   a locking member axially shiftable in said projection and engageable with said base disk for locking said bayonet coupling in an engaged position until manual release of said locking member, whereby release of said locking member enables removal of said bearing member and said device from said base disk.

2. The mounting defined in claim 1 wherein said hole is formed with an axially outwardly turned edge, said formations around said hole being radial projections beneath which the formations of the central projection engage.

3. The mounting defined in claim 2 wherein an outer edge of the base disk is bent axially outwardly to form an axially outwardly projecting annular bead.

4. The mount defined in claim 3 wherein said central projection has a hollow cylindrical shape.

5. The mount defined in claim 4 wherein said locking member has a handle engageable in a recess in said bearing member, further comprising at least one spring in said bearing member biasing said locking member axially toward said base disk.

6. The mount defined in claim 5 wherein said openings are in part formed by radially extending slots.

7. The mount defined in claim 5 wherein said openings are angularly spaced by at least one angle selected from 60, 72, 90 and 120 degrees.

* * * * *